(12) United States Patent
Magnuson et al.

(10) Patent No.: US 8,971,209 B2
(45) Date of Patent: Mar. 3, 2015

(54) SYSTEM TO CONFIGURE AND MANAGE ROUTERS THROUGH WIRELESS COMMUNICATION

(75) Inventors: Phillip T. Magnuson, Boise, ID (US); David Alan Johnson, Boise, ID (US); Gordon McNutt, Meridian, ID (US); Jeff Buttars, Boise, ID (US)

(73) Assignee: Cradlepoint, Inc., Boise, ID (US)

( * ) Notice: Subject to any disclaimer, the term of this patent is extended or adjusted under 35 U.S.C. 154(b) by 421 days.

(21) Appl. No.: 12/958,973

(22) Filed: Dec. 2, 2010

(65) Prior Publication Data

US 2011/0134798 A1 Jun. 9, 2011

Related U.S. Application Data

(60) Provisional application No. 61/266,935, filed on Dec. 4, 2009.

(51) Int. Cl.
| | |
|---|---|
| *G01R 31/08* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/28* | (2006.01) |
| *H04L 12/16* | (2006.01) |
| *H04W 24/02* | (2009.01) |
| *H04Q 1/00* | (2006.01) |
| *H04L 12/715* | (2013.01) |
| *H04L 12/24* | (2006.01) |
| *H04L 12/751* | (2013.01) |
| *H04L 29/06* | (2006.01) |
| *H04W 12/10* | (2009.01) |

(52) U.S. Cl.
CPC ................. *H04W 24/02* (2013.01); *H04Q 1/00* (2013.01); *H04L 45/04* (2013.01); *H04L 41/04* (2013.01); *H04L 41/12* (2013.01); *H04L 45/02* (2013.01); *G06F 2221/2115* (2013.01); *H04L 63/123* (2013.01); *H04W 12/10* (2013.01)
USPC ........... 370/254; 370/216; 370/217; 370/218; 370/219; 370/220; 370/221; 370/222; 370/223; 370/224; 370/225; 370/226; 370/227; 370/235; 370/255; 370/256; 370/257; 370/258

(58) Field of Classification Search
CPC ......... H04L 41/12; H04L 45/02; H04L 45/00; H04L 45/04; H04L 41/04
See application file for complete search history.

(56) References Cited

U.S. PATENT DOCUMENTS

| | | | | |
|---|---|---|---|---|
| 7,861,283 | B2 * | 12/2010 | Kobayashi | 726/2 |
| 2003/0022666 | A1 * | 1/2003 | Sato | 455/423 |
| 2003/0074354 | A1 * | 4/2003 | Lee et al. | 707/8 |
| 2004/0220756 | A1 * | 11/2004 | Minch | 702/58 |
| 2008/0051139 | A1 * | 2/2008 | Pagan | 455/557 |
| 2010/0020753 | A1 * | 1/2010 | Fulknier et al. | 370/329 |
| 2010/0235621 | A1 * | 9/2010 | Winkler et al. | 713/153 |

\* cited by examiner

*Primary Examiner* — Hassan Phillips
*Assistant Examiner* — Lonnie Sweet
(74) *Attorney, Agent, or Firm* — Parsons Behle & Latimer

(57) ABSTRACT

A method for configuring a router is disclosed. The method comprises providing router configuration information. The router configuration information is sent to the router over a cellular data network.

26 Claims, 9 Drawing Sheets

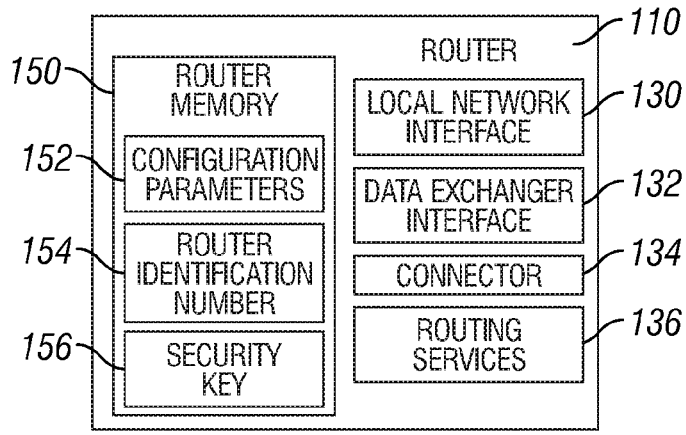
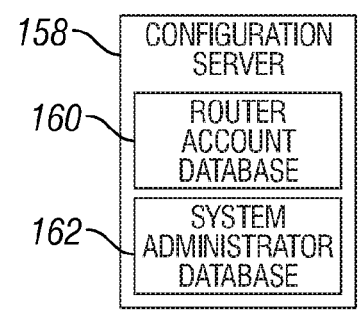

160 — ROUTER ACCOUNT DATABASE

| ROUTER IDENTIFICATION NUMBER | ROUTER SECURITY KEY | AUTHORIZED SYSTEM ADMINISTRATOR | NEW CONFIGURATION PARAMETERS | ROUTER STATUS REPORT |
|---|---|---|---|---|
| R0001 | X93Z2 | ADMIN A | | |
| R0002 | 4790A | ADMIN A | | |
| ⋮ | ⋮ | ⋮ | ⋮ | ⋮ |
| R0123 | | ADMIN B | | |

FIG. 9

SYSTEM ADMINISTRATOR DATABASE

| SYSTEM ADMINISTRATOR IDENTIFICATION | SYSTEM ADMINISTRATOR SECURITY KEY | AUTHORIZED TO ACCESS ROUTER |
|---|---|---|
| ADMIN A | Q479Z | R0001  R0098<br>R0002  •<br>R0095  R1010 |
| ADMIN B | 4ZBA6 | R0003  ⋮<br>R0004  R1011 |
| ⋮ | ⋮ | ⋮ |
| ADMIN Z | 4049A | R0022<br>R0029 |

FIG. 10

SYSTEM TO CONFIGURE AND MANAGE ROUTERS THROUGH WIRELESS COMMUNICATION

The present disclosure claims priority to U.S. Provisional Application No. 61/266,935, filed on Dec. 4, 2009, the disclosure of which is hereby incorporated by reference in its entirety.

BACKGROUND

Routers allow client devices in a local area network (LAN) to access a wide area network (WAN). Connections between client devices and the router may be wired or wireless. Similarly, connections between the router and the Wide Area Network may be wired or wireless. Wireless connections to the WAN may be through a cellular network.

System administrators configure and maintain networking equipment to provide authorized network access to the user community. In a traditional network environment, networking equipment, including routers, is often stationary, and located within the organization's private network. FIG. 1 is an illustrative example of a traditional network environment. The heavy dashed line indicates the boundary of the organization's physical location. There may be a router 10A that provides a bridge and acts as a firewall between the organization's intranet, and the public internet 26. This bridge allows internal users to access the public internet. This may also provide a way for mobile members of the organization to access the organization's intranet through the public internet. To maintain security, this is typically accomplished through VPN or some other means of authorizing and maintaining a secure connection between the laptops and the organization's intranet. The system administrator 64 and corporate server 66 are within the intranet.

In order to configure routers 10A, 10B and other devices on the intranet, the system administrator 64 typically communicates with the routers and other network connected devices using the network from inside the firewall of the organization. If the intranet 25 experiences significant problems, the system administrator 64 may not be able to communicate with the routers 10A, 10B through the network. In this case, the system administrator may need to physically go to each router 10A, 10B to determine the state of operation of the router and make any necessary adjustments.

As the workforce becomes more mobile and geographically dispersed, the work of a system administrator becomes more difficult. Part or all of the organization's network devices may be outside of a traditional firewall. Network users in the organization may have fixed location routers in their homes or satellite offices. Users may also have mobile routers such as cellular routers. To configure these routers, system administrators must manually configure the routers in a central location, and then send the routers to the various locations where the users are located. This is a cumbersome and slow process. In addition, if anything goes wrong with the router, or if the router configuration needs to be changed, the router must be returned to the system administrator.

Alternatively, the routers may be configured by the users according to instructions provided by the system administrator. This is an error-prone process, which requires users to do tasks beyond their normal capabilities. This process often requires extensive help through telephone calls to the system administrator.

It would be advantageous if routers could be shipped directly from the factory to end users, yet be configurable and controllable by system administrators irrespective of the local network configuration where the router is installed. In addition, it would be advantageous if a system administrator could configure and control mobile cellular routers, irrespective of the router's current location, and whether or not the router was presently on. Furthermore, it would be advantageous if the system administrator was able to communicate with and control the routers within the organization's intranet, even if the intranet communication system is not working properly.

SUMMARY

An embodiment of the present disclosure is directed to a method for configuring a router. The method comprises providing router configuration information. The router configuration information is sent to the router over a cellular data network.

Another embodiment of the present disclosure is directed to a system for configuring a router. The system comprises a router configured to communicate over a cellular network. The router comprises a non-transitional computer readable media embedded with computer readable instructions for: communicating with a configuration server over a cellular network, receiving router configuration parameters from the configuration server, and configuring the router using the configuration parameters. The system further comprises a cellular data exchanger configured to provide a communication link between the router and the configuration server over the cellular data network.

Yet another embodiment of the present disclosure is directed to a router. The router comprises a local network interface; routing services; a cellular data exchange component; and a non-transitional computer readable media. The computer readable media are embedded with computer readable instructions for:
communicating with a configuration server over a cellular network, receiving router configuration parameters from the configuration server, and configuring the router using the configuration parameters.

Still another embodiment of the present disclosure is directed to a method for configuring a router. The method comprises communicating with a configuration server over a cellular network, receiving router configuration parameters from the configuration server and configuring the router using the configuration parameters.

DESCRIPTION OF THE DRAWINGS

FIG. 7 illustrates a block diagram of a router, according to an embodiment of the present disclosure.

FIG. 8 illustrates a block diagram of a configuration server, according to an embodiment of the present disclosure.

FIG. 9 illustrates data from a router account database, according to an embodiment of the present disclosure.

FIG. 10 illustrates data from a system administrator database, according to an embodiment of the present disclosure.

Figure 1:
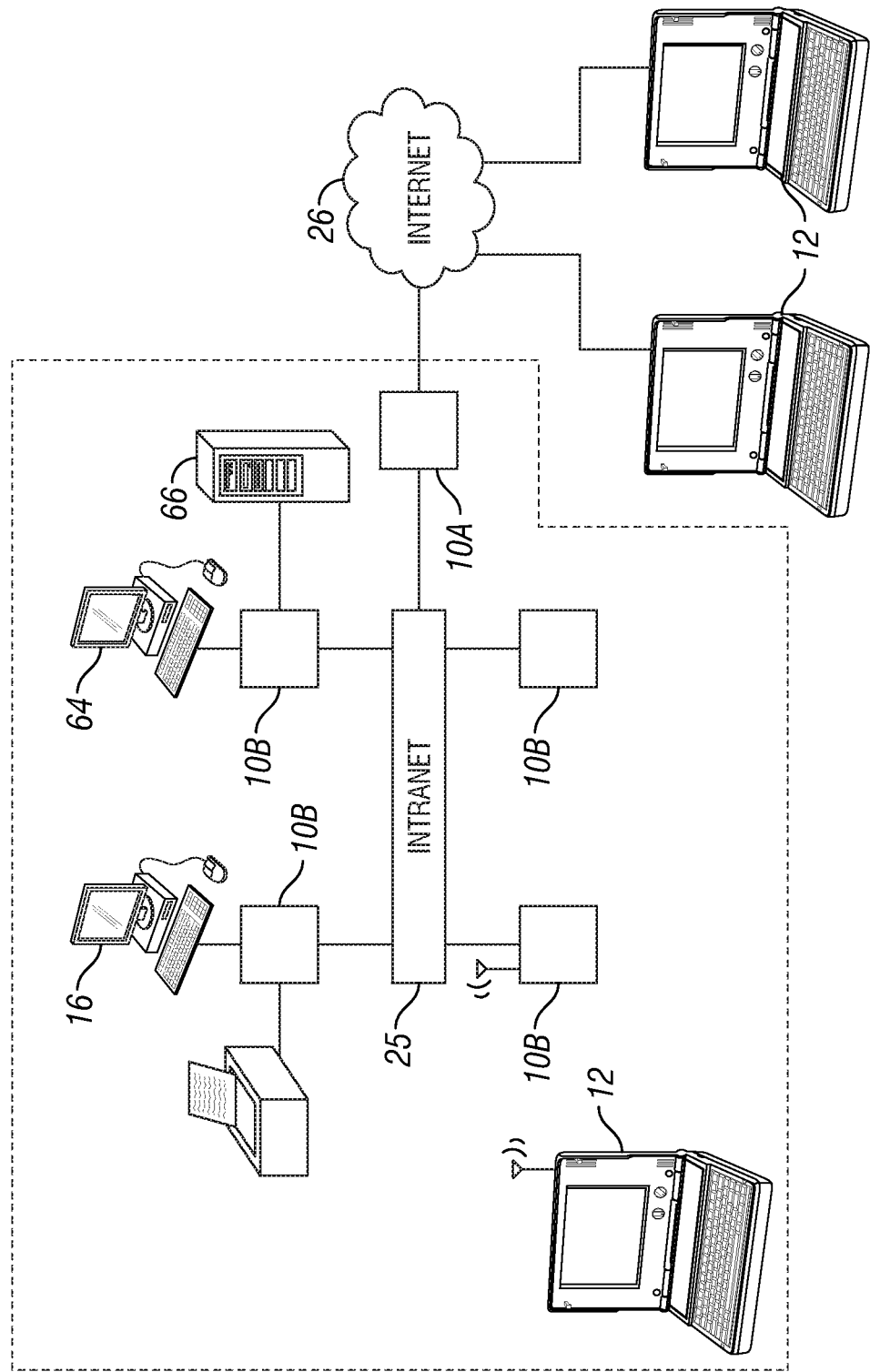
FIG. 1 is an illustrative example of a traditional network environment.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the disclosure as defined by the appended claims.

DETAILED DESCRIPTION

Embodiments of the present disclosure allow a user to connect to the internet using a device such as an internet enabled cellular telephone, wireless modem or other cellular data access device. With a router, multiple users of computing devices such as lap top computers, desktop computers, and personal digital assistants (PDAs) can access the internet simultaneously through the data capabilities of the cellular data access device. The combination of the router and the cellular data access device can provide an internet-connected local wireless network anywhere that there is cellular data coverage.

Figure 2:
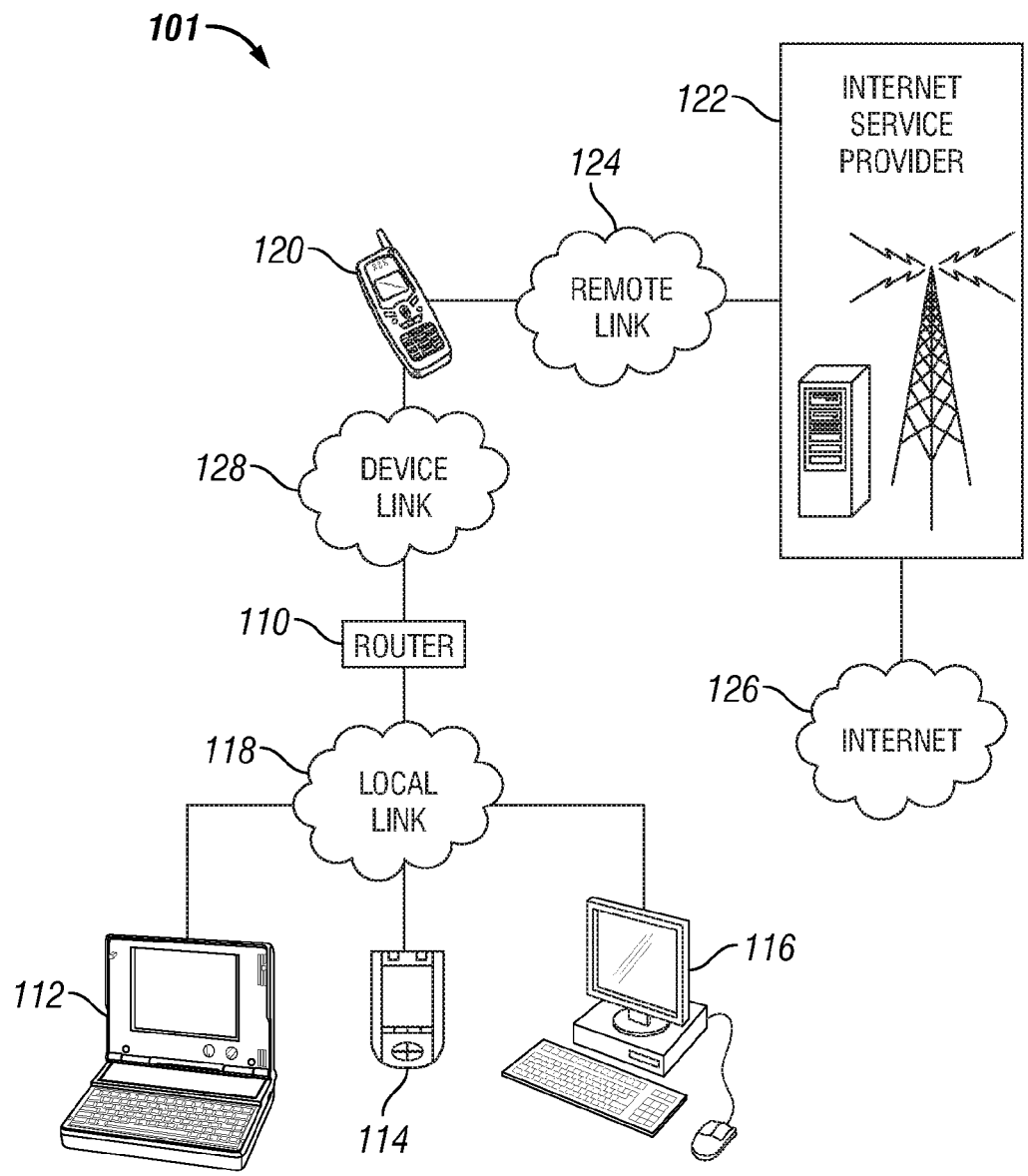
FIGS. 2 and 3 are block diagrams of systems comprising a router, according to embodiments of the present disclosure.

FIG. 2 illustrates exemplary environment 101 in which various embodiments of the present disclosure may be implemented. Environment 101 includes a router 110 and client devices 112, 114, and 116 and local link 118. Router 110, discussed in more detail later, represents generally any device capable of routing network communications between client devices 112, 114, and 116 and internet 126 via a data exchanger 120. Client devices 112, 114, and 116 represent generally any computing devices capable of communicating with router 110.

Local link 118 interconnects router 110 and client devices 112, 114, 116. Local link 118 represents generally a cable, wireless, or remote link via a telecommunication link, an infrared link, a radio frequency link, or any other connector or system that provides electronic communication between devices 110, 112, 114, and 116. The path followed by link 118 between devices 110, 112, 114, and 116 in the schematic view of FIG. 1 represents the logical communication path between these devices, not necessarily the physical path between the devices. Devices 110, 112, 114, and 116 can be connected at any point and the appropriate communication path established logically between the devices.

Environment 101 also includes data exchanger 120 and service provider 122. Data exchanger 120 represents generally any combination of hardware and/or programming that can be utilized by router 110 to connect to a remote network such as the internet. While illustrated as an internet enabled cellular telephone, data exchanger 120 is not so limited. Other examples of suitable data exchanges include but are not limited to DSL modems, cable modems and cellular data modems.

Internet service provider 122 represents generally any infrastructure configured to provide internet related data services to subscribers such as an owner of data exchanger 120. For example, where data exchanger 120 is an internet enabled cellular telephone or cellular modem, service provider 122 may be a cellular telephone service provider capable of providing voice and data services to subscribers allowing access to internet 126. Where data exchanger 120 is a DSL or cable modem, service provider 122 may be a more traditional internet service provider (ISP) providing data access to internet 126 through wired means.

Remote link 124 interconnects data exchanger 120 and service provider 122 and represents generally any combination of a cable, wireless, or remote connection via a telecommunication link, an infrared link, a radio frequency link, or any other connector or system that provides electronic communication between data exchanger 120 and service provider 122. Remote link 124 may represent an intranet, an internet, or a combination of both.

In the embodiment illustrated in FIG. 2, device link 128 interconnects router 110 and data exchanger 120. Device link 128 represents generally any combination of a cable, wireless, or remote connection via a telecommunication link, an infrared link, a radio frequency link, or any other connector or system that provides electronic communication between devices 110 and 120. As examples, device link 128 may incorporate a physical connection such as a USB cable or direct connection between USB connectors, or radio waves carrying Bluetooth communications.

Figure 3:
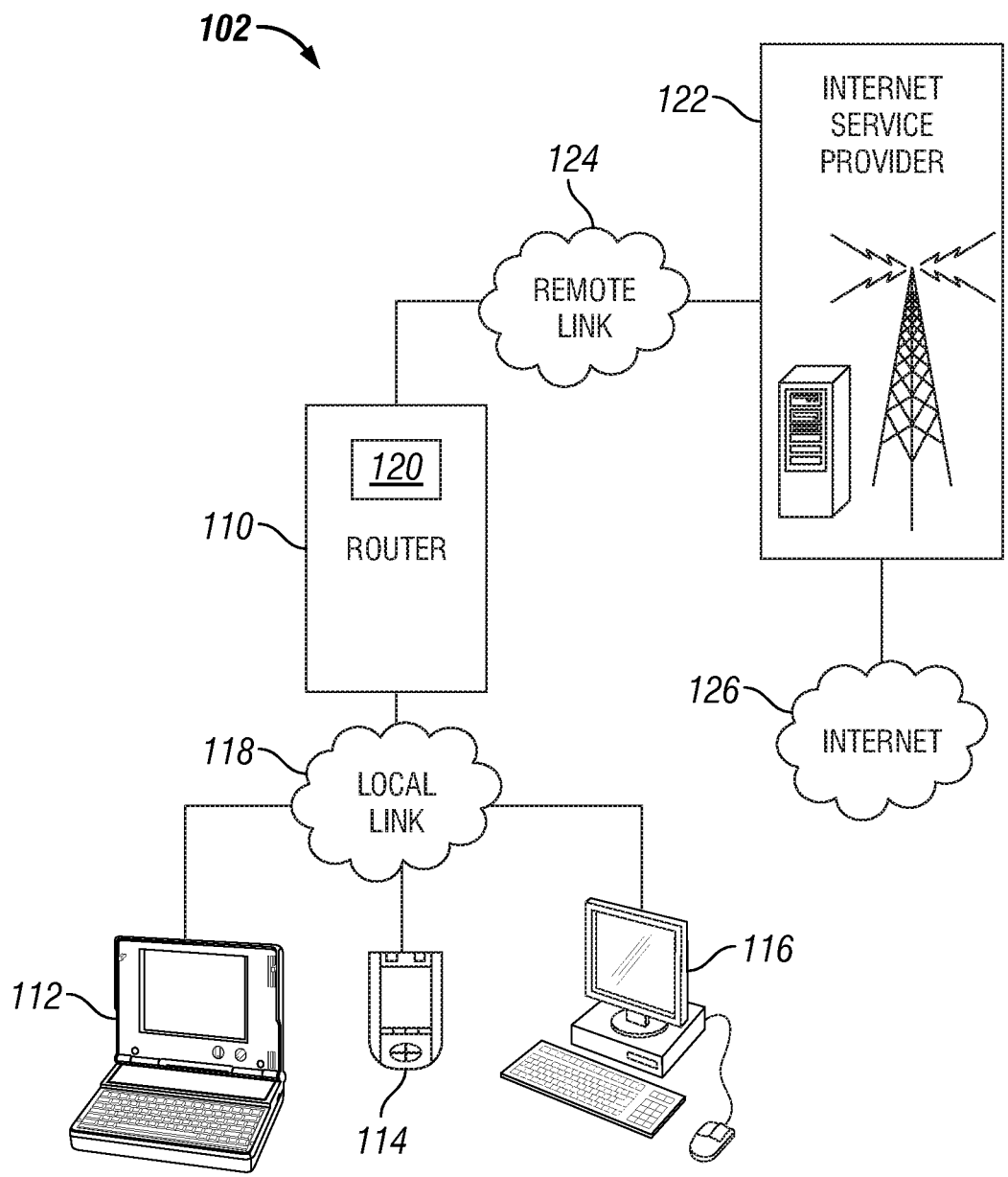

FIG. 3 illustrates another exemplary environment 102 in which various embodiments of the present disclosure may be implemented. In the example of FIG. 3, the data exchanger 120 and router 110 are incorporated within the same device. Device link 128 (shown in FIG. 2) is eliminated and replaced with internal connections. In such a scenario, the data exchanger may take the form of, for example, a separate device card that can be inserted into a slot provided by router 110, a cellular USB modem or other device that can be connected to the router 110 through an I/O port. Alternatively, the data exchanger may be fully integrated into router 110.

Figure 4:
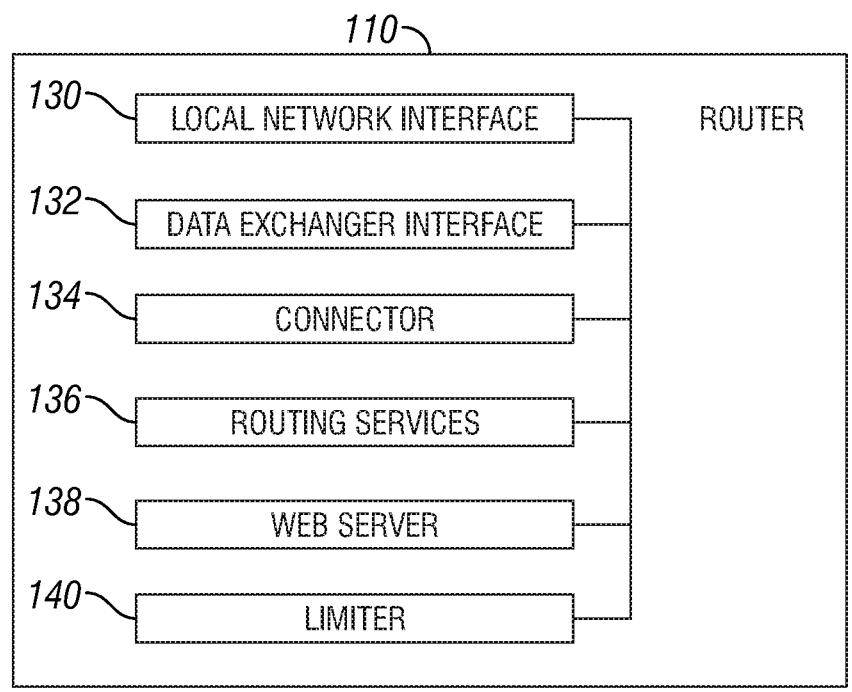
FIG. 4 is a block diagram showing physical and logical components of a router, according to an embodiment of the present disclosure.

FIG. 4 is a block diagram illustrating physical and logical components of router 110, according to an embodiment of the present disclosure. As described above, router 110 represents generally any combination of hardware and/or programming capable of functioning as a router for directing network communications between client devices on the local network, or between client devices and the internet via a data exchanger, such as an internet enabled cellular telephone, cellular modem, DSL modem, or cable modem.

In the example of FIG. 4, router 110 includes local network interface 130 and data exchanger interface 132. Local network interface 130 represents generally any combination of hardware and/or program instructions capable of supplying a communication interface between router 110 and client devices 112, 114, and 116 shown in FIGS. 2 and 3. Data exchanger interface 132 represents any combination of hardware and/or programming enabling data to be communicated between router 110 and a data exchanger 120 shown in FIG. 2. For example, interfaces 130 and 132 may include a transceiver operable to exchange network communications utilizing a wireless protocol such as ultrawideband (UWB), Bluetooth, or 802.11. Alternatively, interfaces 130 and 132 may include physical ports or other physical connection points enabling wired communication. In the case of a data exchanger being embedded in router 10, the interface can be, for example, a slot for a device card or the like.

Router 110 can also include routing services 136 and web server 138. Routing services 136 represent generally any combination of hardware and/or programming for routing network communication received through local network interface 130 to be transmitted by data exchanger 120 to internet 126. Routing services 136 is also responsible for routing inbound network communications received from internet 126 and directed via network interface 130 to a specified client device 112, 114, or 116. Outbound and inbound network communications, for example can be IP (internet protocol) packets directed to a target on internet 126 or to a particular network device 112, 114, or 116 on a local area network.

Web server 138 represents generally any combination of hardware and/or programming capable of serving interfaces such as web pages to client devices 112, 114, and 116. Such web pages may include web pages that when displayed by a network device allows a user to provide or otherwise select settings related to the operation of router 110.

Router 110 can optionally include a connector 134. Connector 134 represents generally any combination of hardware and/or programming for sending a signal to data exchanger 120 to establish a data connection with service provider 122 so that access can be made to internet 126. For example, where a data exchanger 120 is a cellular telephone, connector 134 may send a signal causing the cellular telephone to establish such a data link with service provider 122. In an embodiment, the router 110 does not include a connector 134. In an embodiment, the hardware and/or programming for establishing a data connection with service provider 122 is included in, for example, a cellular modem that is employed as the data exchanger 120, which may be incorporated into router 110, as described above with respect to FIG. 3.

The router can also optionally include a limiter 140. Limiter 140 represents generally any combination of hardware and/or programming capable of distinguishing among the users of devices such as client devices 112, 114, and 116, and applying different internet access rules for different users. For example, certain internet access rules may apply to the owner of router 110. In this context, the term owner refers to an individual or entity that is a subscriber with respect to a service provider such as service provider 122 shown in FIGS. 1 and 2. The owner typically has physical possession or otherwise has control of router 110. Other internet access rules can apply to users authorized by the owner. Yet other internet access rules apply to anonymous users. Where network interface 130 provides for a wireless connection with client devices, a user of a particular client device might not be known by the owner. As such, internet access rules for such users may be quite limiting. The limiter 140 and operation thereof is discussed in greater detail in U.S. patent application Ser. No. 11/673,956, filed Feb. 12, 2007, in the name of Pat Sewall, et al., the disclosure of which is hereby incorporated by reference in its entirety. In an alternative embodiment, the router 110 does not include a limiter 140.

Figure 5:
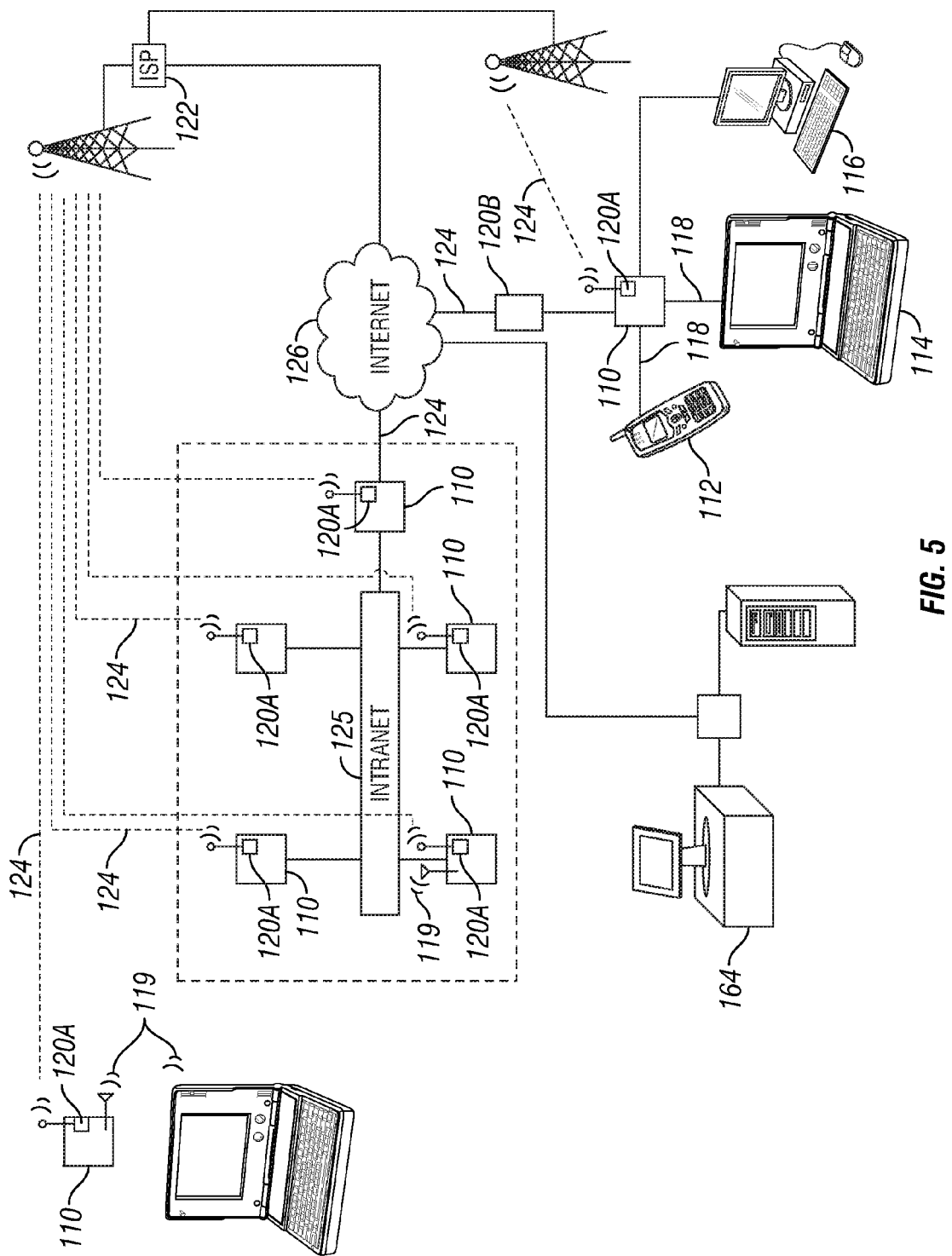
FIG. 5 illustrates an intranet comprising a plurality of routers equipped with data exchangers that allow the routers to communicate through a wireless remote link to a cellular communication tower, and thence onward to a service provider, according to an embodiment of the present disclosure.

FIG. 5 illustrates an embodiment of the present disclosure in which each router 110 is equipped with a data exchanger 120A that allows the router to communicate through a wireless remote link 124 to cellular communication towers, and thence onward to the service provider 122. The routers can employ either external or internal data exchangers, as discussed with respect to FIGS. 2 and 3. In an embodiment, the router communicates with the internet using solely the cellular data exchanger. In another embodiment, another data exchanger 120B can be employed in addition to the cellular data exchangers 120A. For example, the routers 110 may also be connected to the internet though intranet 125, which can employ a data exchanger (not shown) that allows users of the intranet 125 to access the internet. In another embodiment, the additional data exchanger can be a modem 121 (shown in FIG. 5), which is illustrated as a wired modem, but which could also be a wireless stand alone modem or a wired or wireless modem that is internal to the router 110.

Figure 6:
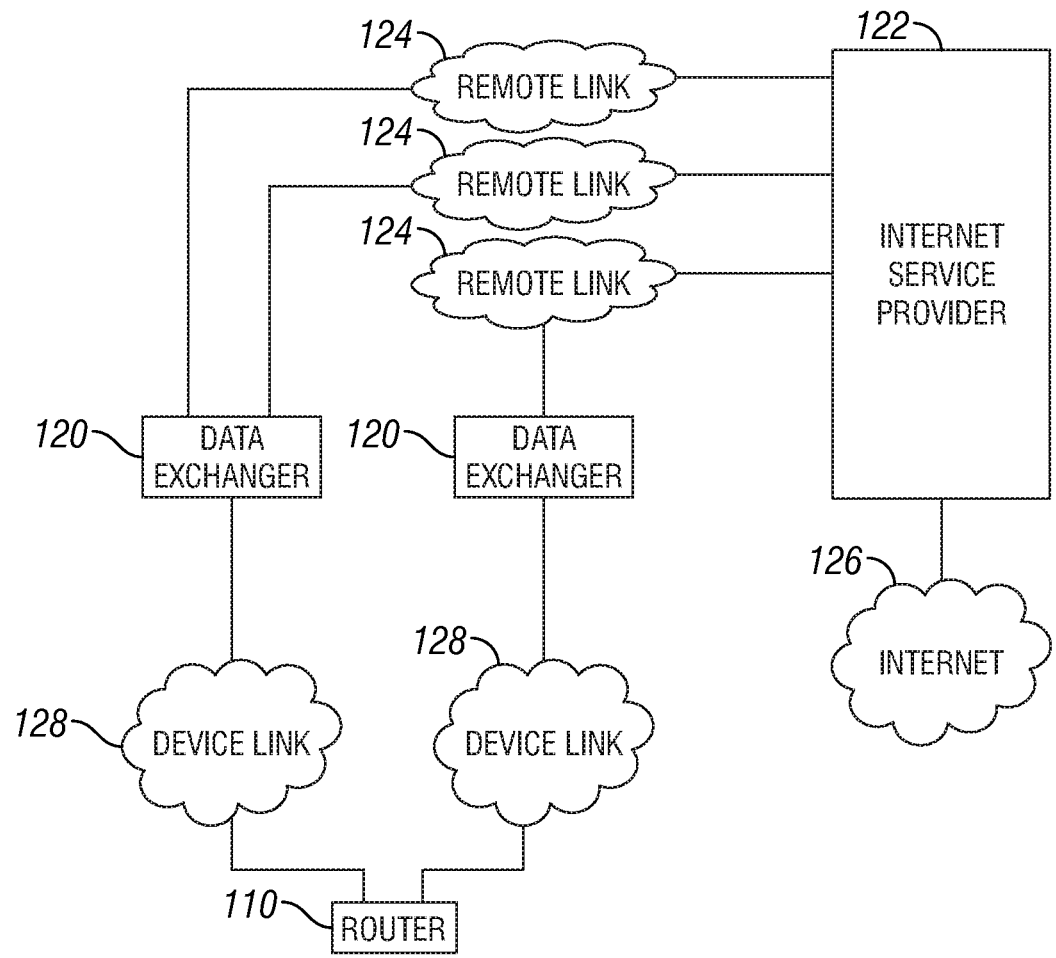
FIG. 6 illustrates a system comprising a router linked to one or more additional data exchangers, according to an embodiment of the present disclosure.

FIG. 6 shows another example of a router 110 connected to multiple data exchangers 120. The data exchangers 120 can include a cellular data exchanger in addition to, for example, a DSL or cable modem.

If desired, the data exchangers can include a second cellular data exchanger that connects to the internet using a different ISP, such as Verizon, Clearwire, and AT&T, than is used by the first cellular data exchanger. Cellular modems that are capable of talking to different ISPs are well known in the art. As is also well known in the art, such cellular modems can use different fundamental wireless communication technologies (e.g., CDMA, GSM, EDGE, LTE) where the modem can be switched between these modes through simple software commands.

The routers 110 may have wired, wireless or a combination of wired and wireless connection(s) that provide a local link 118 to client devices 112, 114, 116. For example, some of the routers 110 in FIG. 5 are equipped to send and receive wireless signals 119 using, for example, Wi-Fi technology, to provide a wireless local link.

These router capabilities allow routers to perform normal routing functions with wired or wireless remote link to the intranet 125 or internet 126, and wired or wireless local link 118 for local client devices 112, 114, 116, while also providing a cellular data communication capability through a cellular data exchanger 120.

As shown in FIG. 5, the presence of the cellular data exchanger 120A in each router 110, allows the router 110 to be available on the cellular data network, irrespective of the state of the organization's intranet, the presence of firewalls in bridges or modems, or the state of the wired connection of the router 110 through a modem 121 to the internet 126. This is possible because the cellular data communication method can bypass some or all traditional network protocols, allowing direct communication between the router 110 and the cellular data network. System administrators can take advantage of this communication path to configure and control the routers 110.

Referring to FIG. 7, at the time of manufacture, each router 110 is provided with a unique router identification number 154 and a security key 156, which is stored in the router memory 150, according to an embodiment of the present disclosure. The router identification number 154 and security key 156 are also provided to a configuration server 158, as shown in FIG. 8, to create an entry in the router account database 160 on the configuration server 158.

Figure 11:
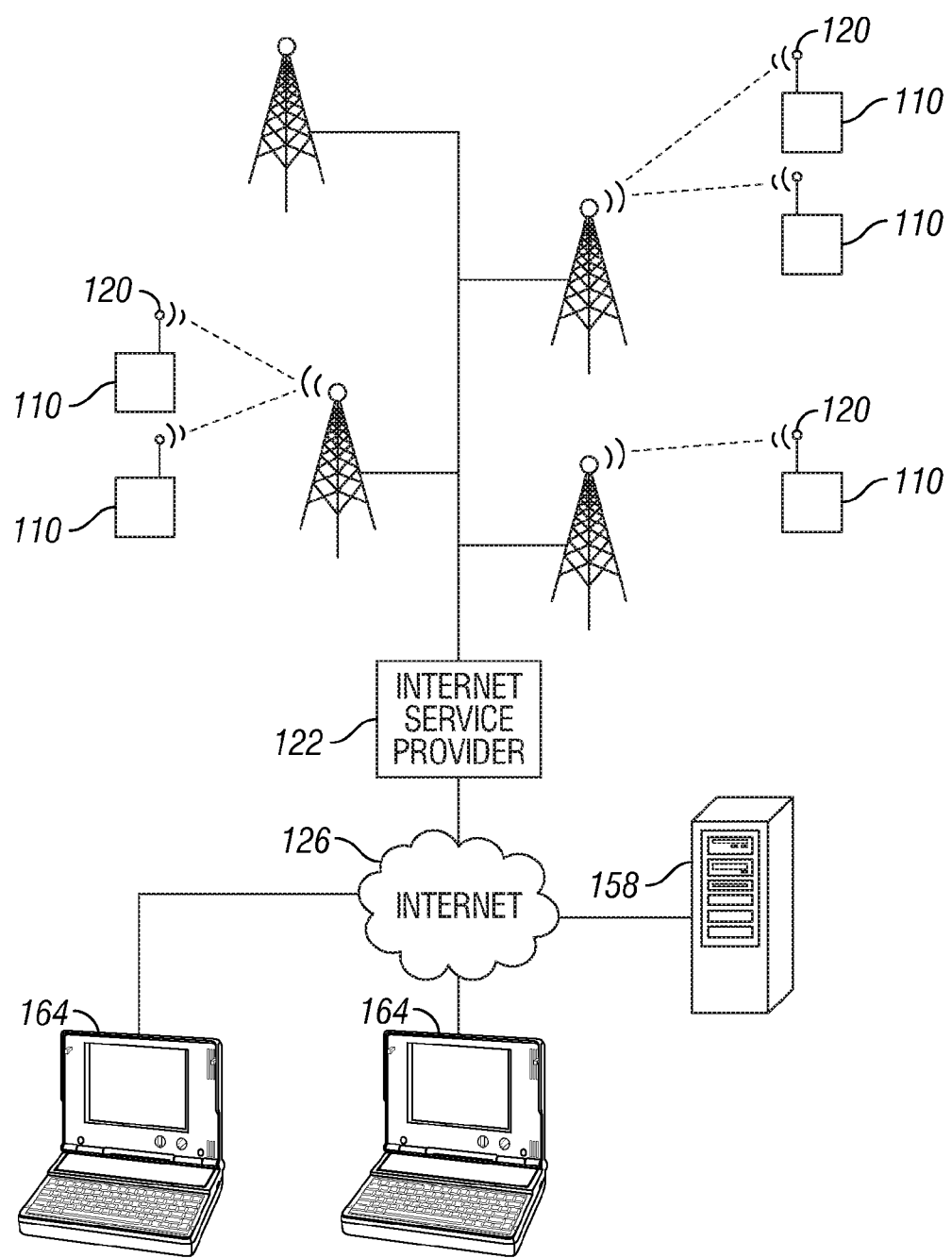
FIG. 11 is a schematic diagram of a system comprising routers that are configured to use a cellular data network to establish a connection with a configuration server, according to an embodiment of the present disclosure.

Referring to FIG. 11, routers 110 can be configured to use the cellular data network to periodically establish a secure connection with the configuration server 158. The configuration server 158 can be available on the cellular data network, or can be accessible on the internet 126 to which the cellular data network is also connected. When the router 110 contacts the configuration server 158, the router 110 provides the router identification number 154 and security key 156, as shown in FIG. 7. The configuration server 158 checks the router account database 160, as shown in FIGS. 8 and 9, to verify the identity of the router 110. Each router account in the router account database 160 can have associated configuration parameters intended for use with the corresponding router 110. After the connection is verified, the configuration server 158 checks the associated router account in the router account database 160 to determine whether new configuration parameters should be downloaded to the router 110. If there are new configuration parameters to be downloaded, the configuration server 158 downloads the new configuration parameters to the router 110. The router 110 is programmed to accept the new configuration parameters from the configuration server 158 and to replace or augment the old configuration parameters with the new configuration parameters. In addition, or in the alternative, the router 110 can be configured to accept commands and configuration parameters from the configuration server 158 when the configuration server 158 initiates the contact.

As an example, configuration parameters 152, as shown in FIG. 7, may include the rules that the router 110 uses to determine when to attempt contact with the configuration server 158. The configuration parameters 152 may also set the DNS services used by the router 110 and/or may set the security protocols used by the router 110 when communicating with local clients 112, 114, 116.

In an embodiment, the router 110 may be configured to upload information to the router account database 160 on the configuration server 158, as shown in FIG. 8. For example, the information may include the results of statistical analysis of previous operation of the routers (as calculated by the router 110), failure codes and diagnostic codes, or characteristic information concerning interaction with client device 112, 114, 116.

Each system administrator 164 has access to the uploaded information and control of the configuration parameters 152 in the router account database 160 for a subset of routers 110 for which that system administrator is authorized to administer. This access is governed by the system administrator database 162, as shown in FIGS. 8 and 10.

Because this system allows system administrators 164 to control routers 110 irrespective of local link 118 or any non-cellular remote link behavior, system administrators 164 have new and useful ways of configuring and managing network services.

Figure 12:
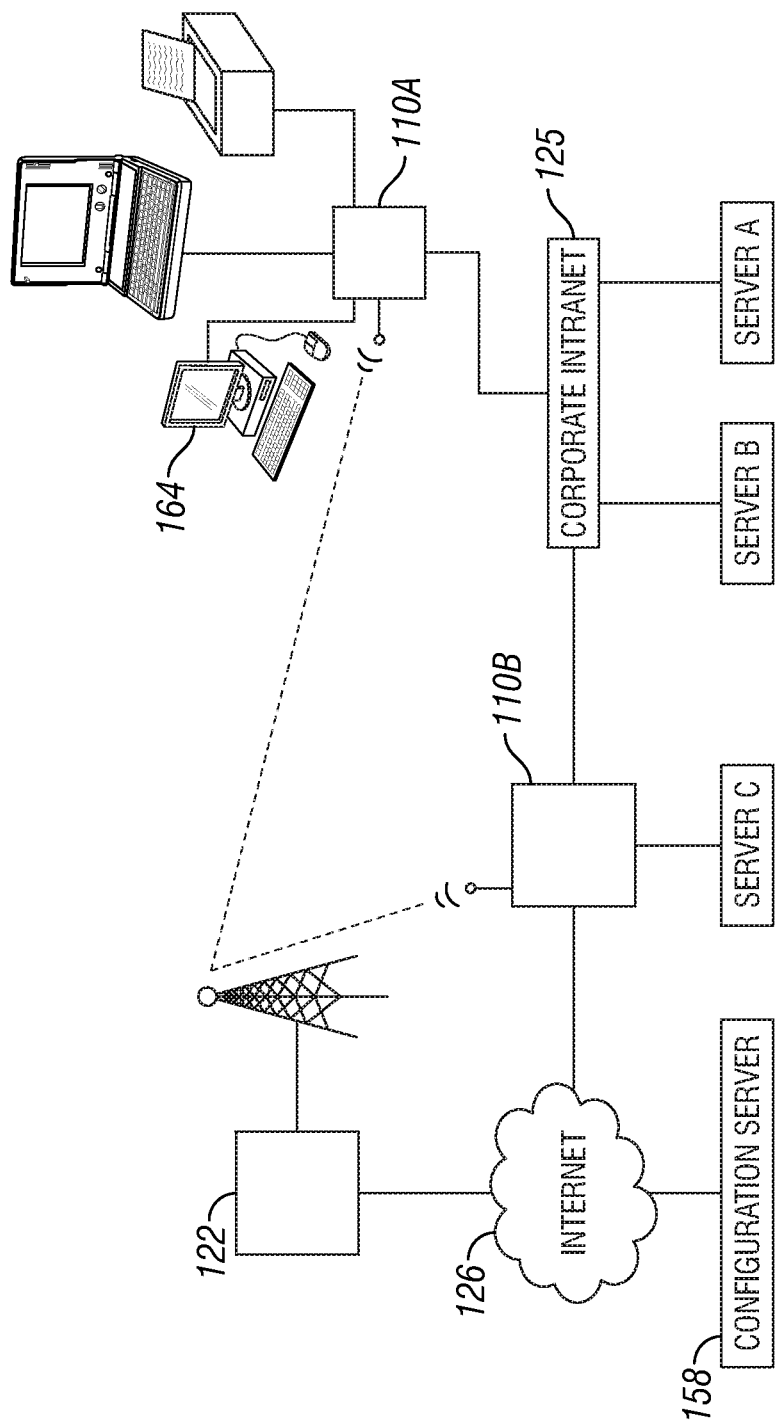
FIG. 12 is a schematic diagram of a system comprising routers on a wired network servicing a corporate internet, where the routers can be configured using a cellular data network, according to an embodiment of the present disclosure.

For example, as shown in FIG. 12, routers 110A and 110B may normally operate on a wired network servicing a corporate intranet 125. If the corporate intranet 125 fails due to a network problem caused by router 110B, the system administrator 164 may lose contact with all network devices that do not reside on the local network of router 110A.

Router 110B can be configured to contact the configuration server 158 at regular intervals and upload information about the behavior of the network, and the behavior of the router 110B. This information may have been collected over the past few days or weeks. The configuration server 158 can have a well known address, thereby allowing router 110B to initiate contact with configuration server 158. In an embodiment, as will be described in detail below, the address for router 110B can change. Thus, a possible advantage of programming router 110B to initiate contact with configuration server 158 is that router 110B can consistently know the address for contacting configuration server 158, whereas if the router address changes, the configuration server 158 may not be able to contact router 110B.

It is possible for a single router 110B to have a plurality of different addresses depending on the device link/remote link pair that is active. The information sent to the configuration server can include address information for router 110B, including any changes or alternate addresses for the router 110B. Referring to FIG. 6, for example, router 110 can employ multiple device links and/or multiple remote links to provide access to the internet 122. If only a single device link/remote link pair is active, the router may have a first address. In the case where an alternate device link and/or remote link is used to access the internet, the router can have a second address that is different from the first address. If the router is capable of contacting the configuration server through multiple device links, the router's current address for the link being used can be provided to the configuration server. In an embodiment, the router can also provide the current address for any other device link that the router has access to, so that the configuration server 158 is aware of all possible addresses for communicating with the router.

In an embodiment, the router 110B is configured to contact the configuration server 158 when a network fault is detected. The system administrator 164 has provided configuration parameters in the router account database 160 that instruct the router 110B to load diagnostic code, to reboot, and then upload more detailed diagnostic data to the router account database 160 on the configuration server 158.

When the local wired network fails, the system administrator 164 may use the internet to access all the uploaded diagnostic information to determine what has gone wrong with the router 110B. This information may help the system administrator 164 determine the appropriate configuration parameters 152 to remedy the problem. The system administrator 164 changes the configuration parameters 152 in the router account database 160, and instructs the configuration server 158 to push the new configuration parameters 152 to the router 110B.

In addition, the configuration server 158 may have rules that dynamically select new configuration parameters 152 to send to the routers 110, based on the information uploaded to the configuration server 158 by the routers 110. For example, in FIG. 12, the router 110B may use the cellular data network to inform the configuration server 158 that the router 110B is unable to establish a connection to the Internet 126. Without any involvement of the system administrator 164, the configuration server 158 may use preprogrammed rules to automatically instruct the router 110B to change configuration parameters 152 and reboot itself, attempt to establish a connection to the internet 126, and to then inform the configuration server 158 as to whether the connection was established.

In an embodiment, the router manufacturer can control access to the configuration server 158 and populate the router account database 160 with the router identification numbers 154 and router security keys 156. The router manufacturer can also control the system administrator database 162, determining which system administrators 164 have access to which routers 110. In an embodiment, each system administrator 164 account can provide access and control over the entries in the router account database 160 on the configuration server 158 that correspond to the routers 110 belonging to that system administrator's 164 organization.

If desired, routers 110 can be configured to check with the configuration server 158 when the router 110 is first turned on, and at regular intervals thereafter. This helps to insure that any new configuration parameters 152 in the router account database 160 are downloaded to each router 110 in a timely fashion. This can also allow a system administrator 164 to set configuration parameters 152 for routers 110, even when a router 110 is not presently active, or the network is slow or non-functioning.

The configuration parameters 152 that are downloaded from the configuration server 158 to the router 110 may include system administrator identification and system administrator security keys for the authorized system administrator 164. The router 110 can then authenticate a direct connection with the system administrator 164 through the cellular data network, allowing the system administrator 164 to directly interrogate and control the router 110, in addition to the indirect control available through changes to the router account database 160 on the configuration server 158.

As discussed above, routers 110 may have multiple data exchangers 120 with multiple remote links 124 to networks, where at least one of the data exchangers 120 is a cellular data exchanger operable on the cellular data network. Alternatively, the router 110 may have only one data exchanger 120 that operates only on the cellular data network.

Data exchangers 120 may be external devices, connected to the router 110 through a device link 128. Alternatively, data exchangers 120 may be wholly or partially enclosed in the physical enclosure of the router 110.

In an embodiment, routers 110 may primarily communicate through a wired network for normal exchange of data, or a combination of wired and local wireless networking to communicate with client devices 112, 114, 116, or with the local network, as shown in FIG. 5, and only use the cellular data network to periodically report status or allow system administrator access for configuration purposes. Alternately, the routers 110 may use the cellular data network frequently, or as a primary means of communication.

In an embodiment, algorithms on the configuration server 158 may aggregate information from multiple routers 110, analyze the information, and provide a system administrator with warning messages, statistical reports, trends reports or other similar types of communication and information. In an embodiment, algorithms on the configuration server 158 may aggregate information from multiple routers 110, analyze the information, and change the configuration of one or more routers 110 under the control of the configuration server 158. For example, the organization may have a cap on data usage, and the configuration server 158 may have rules to slow down or turn off data capabilities on some routers 110 so as to minimize overage charges.

The schematic diagrams of the figures illustrate exemplary environments in which embodiments of the present disclosure may be implemented. Implementation, however, is not limited to these environments. The diagrams of the figures show the architecture, functionality, and operation of various embodiments of the present disclosure. A number of the blocks are defined as programs. Each of those blocks may represent in whole or in part a module, segment, or portion of code that comprises one or more executable instructions to implement the specified logical function(s). Each block may represent a circuit or a number of interconnected circuits to implement the specified logical function(s).

Also, the present disclosure can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of the figures show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

The present disclosure has been shown and described with reference to the foregoing exemplary embodiments. It is to be understood, however, that other forms, details and embodiments may be made without departing from the spirit and scope of the disclosure.

What is claimed is:

1. A method for configuring a router having a router identification number, the method comprising:
   receiving a system administrator identification and a system administrator security key;
   associating the system administrator identification with the router identification number so as to permit a system administrator with the necessary system administrator identification and system administrator security key to remotely access configuration parameters of the router or a status report of the router;
   receiving router configuration parameters comprising (i) a connection schedule dictating times at which the router should attempt to contact a configuration server, (ii) DNS services configuration information, and (iii) security protocol information;
   receiving a communications connection from the router;
   receiving status report information from the router, wherein the status report information comprises (i) statistical analysis of previous operation of the router, (ii) failure and diagnostic codes, and (iii) characteristic information related to interactions between the router and client devices;
   associating the received status report information with the router; and
   sending the router configuration parameters to the router over a cellular data network.

2. The method of claim 1, wherein the router configuration parameters are provided by a configuration server.

3. The method of claim 2, wherein the configuration parameters are periodically updated and stored on the configuration server.

4. The method of claim 2, wherein the configuration server automatically communicates the configuration parameters to the router on a periodic basis.

5. The method of claim 1, further comprising:
   receiving a communication comprising the router identification number and a router security key; and
   checking the router identification number and the router security key against entries in a router account database.

6. The method of claim 5, wherein checking the router identification number and the router security key comprises comparing the router identification number and the router security key with a router identification number and a router security key provided by a manufacturer of the router.

7. The method of claim 1, wherein sending the router configuration parameters comprises analyzing the received status report information and selecting the router configuration parameters from a plurality of possible router configuration parameters based on the analyzed received status report information.

8. The method of claim 1, further comprising sending system administrator information to the router, the system administrator information comprising data that can be used by the router to authenticate a direct connection with the system administrator.

9. A system for configuring a router, the system comprising:
- a corporate intranet;
- a configuration server comprising:
  - a router account database comprising (i) a table of authorized routers based on a router identification number and a router security key, (ii) a table of authorized system administrators for each of the authorized routers, (iii) a table of configuration parameters for each of the authorized routers, and (iv) status report information for each of the authorized routers; and
  - a system administrator database comprising a table of system administrator identifications, system administrator security keys, and router identification numbers for which each system administrator identification is authorized to provide configuration parameters;
- a router communicably connected to the corporate intranet via a wired connection, the router also configured to communicate over a cellular network, the router comprising a router identification number and a router security key stored in a non-transitory computer-readable medium, the non-transitory computer-readable medium further comprising computer-readable instructions for:
  - transmitting the router identification number and the router security key to the configuration server via a cellular network;
  - transmitting status report information comprising (i) statistical analysis of previous operation of the router, (ii) failure and diagnostic codes, and (iii) characteristic information related to interactions between the router and client devices;
  - receiving router configuration parameters from the configuration server, wherein the router configuration parameters comprise (i) a connection schedule dictating times at which the router should attempt to contact the configuration server, (ii) DNS services configuration information, and (iii) security protocol information; and
  - configuring the router using the configuration parameters; and
- a cellular data exchanger configured to provide a communication link between the router and the configuration server over the cellular data network.

10. The system of claim 9, wherein the router is configured to wirelessly connect to the internet using the cellular data exchanger.

11. The system of claim 10, wherein the router is also configured to provide a local wireless network.

12. The system of claim 9, wherein the cellular data exchanger is incorporated into the router.

13. The system of claim 12, wherein the router and the cellular data exchanger are fully integrated.

14. The system of claim 9, wherein the cellular data exchanger is a cellular phone.

15. The system of claim 9, further comprising a second data exchanger in addition to the cellular data exchanger.

16. The system of claim 15, wherein the second data exchanger comprises a modem selected from the group consisting of DSL modems, cable modems and wireless modems.

17. A router, comprising:
- a local network interface;
- routing services;
- a data exchanger interface;
- a wired data exchange component communicably coupled to the data exchanger interface;
- a cellular data exchange component communicably coupled to the data exchanger interface; and
- a non-transitory computer readable medium comprising a router identification number and a router security key, and further comprising computer-readable instructions for:
  - transmitting the router identification number and the router security key to a configuration server via a cellular network;
  - transmitting status report information comprising (i) statistical analysis information related to previous operation of the router, (ii) failure and diagnostic codes, and (iii) characteristic information related to interactions between the router and client devices;
  - receiving router configuration parameters from the configuration server, wherein the router configuration parameters comprise (i) a connection schedule dictating times at which the router should attempt to contact the configuration server, (ii) DNS services configuration information, and (iii) security protocol information;
  - configuring the router using the configuration parameters; and
  - establishing a connection to the configuration server upon detection of a network fault at the wired data exchange component.

18. The router of claim 17, wherein the local network interface is configured to provide a local wireless network.

19. The router of claim 18, wherein the router is configured to provide a local wired network.

20. A non-transitory computer-readable medium on a router, the non-transitory computer-readable medium comprising a router identification number and a router security key, the computer-readable medium also comprising computer-executable code having router instructions that when executed perform a method for:
- transmitting the router identification number and the router security key to a configuration server via a cellular network;
- transmitting status report information comprising (i) statistical analysis of previous operation of the router, (ii) failure and diagnostic codes, and (iii) characteristic information related to interactions between the router and client devices;
- receiving router configuration parameters from the configuration server, wherein the router configuration parameters comprise (i) a connection schedule dictating times at which the router should attempt to contact the configuration server, (ii) DNS service configuration information, and (iii) security protocol information; and
- configuring the router using the configuration parameters.

21. The non-transitory computer readable medium of claim 20, further comprising computer-readable instructions for automatically initiating contact with the configuration server upon detection of a network fault.

22. The non-transitory computer readable medium of claim 20, further comprising computer-readable instructions for accepting commands and receiving configuration parameters when the configuration server initiates contact with the router.

23. The non-transitory computer readable medium of claim 20, further comprising computer readable instructions for:
- receiving system administrator identification and system administrator security keys for an authorized system administrator; and
- authenticating a direct connection with the system administrator through a cellular data network.

24. The non-transitory computer readable medium of claim 20, further comprising computer readable instructions for:
communicating through a first network to exchange data; and
periodically communicating over the cellular data network, the cellular data network being different than the first network.

25. The non-transitory computer readable medium of claim 20 further comprising instructions for automatically initiating communication with the configuration server at regular intervals and downloading any updated router configuration parameters made available by the configuration server.

26. The non-transitory computer readable medium of claim 20, further comprising instructions for: (i) detecting a network fault, (ii) initiating contact with the configuration server; and (iii) downloading configuration parameters from the configuration server in response to the network fault.

* * * * *